US009652719B2

(12) United States Patent
Bounouane et al.

(10) Patent No.: US 9,652,719 B2
(45) Date of Patent: *May 16, 2017

(54) AUTHORING SYSTEM FOR BAYESIAN NETWORKS AUTOMATICALLY EXTRACTED FROM TEXT

(71) Applicant: SINOEAST CONCEPT LIMITED, Hongkong (HK)

(72) Inventors: Lamia T. Bounouane, Dublin (IE); Lea Deleris, Dublin (IE); Bogdan E. Sacaleanu, Saarbrucken (DE); Brian F. White, Yorktown Heights, NY (US)

(73) Assignee: SINOEAST CONCEPT LIMITED, Wanchai (HK)

( * ) Notice: Subject to any disclaimer, the term of this patent is extended or adjusted under 35 U.S.C. 154(b) by 536 days.

This patent is subject to a terminal disclaimer.

(21) Appl. No.: 14/029,408

(22) Filed: Sep. 17, 2013

(65) Prior Publication Data

US 2014/0250047 A1 Sep. 4, 2014

Related U.S. Application Data

(63) Continuation of application No. 13/782,526, filed on Mar. 1, 2013, now Pat. No. 9,361,587.

(51) Int. Cl.
*G06N 5/00* (2006.01)
*G06F 1/00* (2006.01)
(Continued)

(52) U.S. Cl.
CPC ......... *G06N 7/005* (2013.01); *G06F 17/2765* (2013.01)

(58) Field of Classification Search
CPC ............ G06N 7/005; G06N 5/048; G06N 5/04
See application file for complete search history.

(56) References Cited

U.S. PATENT DOCUMENTS 7,730,072 B2 6/2010 Richter et al.
2001/0044791 A1 11/2001 Richter et al.
(Continued)

OTHER PUBLICATIONS

Office Action dated Sep. 18, 2015, received in a related U.S. Appl. No. 13/782,526.
(Continued)

*Primary Examiner* — Stanley K Hill
*Assistant Examiner* — Kalpana Bharadwaj
(74) *Attorney, Agent, or Firm* — Anova Law Group, PLLC

(57) ABSTRACT

A system and computer program product that facilitates authoring of a Bayesian Belief Networks by: accessing text content stored in a content storage device; identifying statements within said accessed text content indicating a dependence relation; extracting said statements indicating said dependence relation from said text content; and aggregating said extracted statements into a form suitable for representation as a BBN network structure. To identify statements indicating a dependence relation, the system identifies one or more lexical and semantic attributes of variables within a text unit indicating a conditional dependence relation between two or more variables. The system further processes the text content to extract probabilistic information and probability statements and aggregate the probability statements into a quantitative layer of the BBN structure.

17 Claims, 8 Drawing Sheets

(51) Int. Cl.
*G06N 7/00* (2006.01)
*G06F 17/27* (2006.01)

(56) References Cited

U.S. PATENT DOCUMENTS

| | | | |
|---|---|---|---|
| 2003/0130973 A1* | 7/2003 | Sumner, II | G06F 19/3437 706/45 |
| 2005/0033712 A1* | 2/2005 | D'Ambrosio | G06Q 30/02 706/52 |
| 2005/0058261 A1 | 3/2005 | Baumard | |
| 2008/0114800 A1 | 5/2008 | Gazen et al. | |
| 2010/0161316 A1 | 6/2010 | Haug | |
| 2011/0282877 A1 | 11/2011 | Gazen et al. | |

OTHER PUBLICATIONS

Office Action dated Jan. 8, 2015, received in a related U.S. Appl. No. 13/782,526.

Ma, et al., "An Approach to Automatic Phonetic Baseform Generation Based on Bayesian Networks"< http://www.ip.com/pubview/IPCOM000161022D, Dec. 17, 2007.

Tripathi, et al., "Enabling Autonomics—Bayesian Network for Root Cause Analysis", http://www.ip.com/IPCOM000159801D, Oct. 29, 2007.

Kim, et al., "GENIA corpus—a semantically annotated corpus for bio-textmining", Bioinformatics, vol. 19, Supp. 1, pp. i180-i182, DOI: 10:1093/bioinformatics/btg 1023, Oxford University Press 2003, received on Jan. 6, 2003; accepted on Feb. 20, 2003.

"Penn Treebank II Tag", http://bulba.sdsu.edu/jeanette/thesis/PennTags.html, last printed Feb. 18, 2013.

Marcus, et al., "The Penn Treebank: Annotating Predicate Argument Structure", HLT '94 Proceedings of the workshop on Human Language Technology, pp. 114-119 (1994).

Saleh, et al., "ZamAn and Ragm: Extracting Temporal and Numerical Expressions in Arabic", AIRS'11 Proceedings of the 7th Asia conference on Information Retrieval Technology, pp. 562-573, (2011).

Theobald, et al., "Extraction of Conditional Probabilities of the Relationships Between Drugs, Diseases, and Genes from PubMed Guided by Relationships in PharmGKB", Summit on TranslatBioforms, 2009, pp. 124-128, published online Mar. 1, 2009.

* cited by examiner

AUTHORING SYSTEM FOR BAYESIAN NETWORKS AUTOMATICALLY EXTRACTED FROM TEXT

CROSS REFERENCE TO RELATED APPLICATION

This application is a continuation of U.S. patent application Ser. No. 13/782,526, filed Mar. 1, 2013 the entire content and disclosure of which is incorporated herein by reference.

BACKGROUND

The present disclosure generally relates to authoring systems and methods, and more particularly, to a system and method for automatically extracting Bayesian networks from text.

Bayesian belief networks (BBNs) are graphical models that encode probabilistic dependence among random variables in a computationally tractable way, where the random variables are represented by nodes in a directed acyclic graph, and dependence relations by arcs. In addition to the graph, a BBN includes a quantitative layer that encodes for each variable the probability distribution of that variable conditional on its parents in the graphs. When all variables are discrete random variables, those probability distributions are encoded as conditional probability tables (CPT).

BBNs have the advantage that expert knowledge can be encoded and represented as a set of probabilities, rather than as fixed rules, as in an expert system. They can compute the probabilities of both single variables and combinations of variables, and allow automatic updating of probability estimates in the presence of new data.

BBNs are widely applied within a variety of contexts, including engineering, computer science, medicine and bioinformatics. For example, they have been used in clinical decision support systems for years, and systems applying BBNs to diagnostics include:

the Iliad system (http://www.openclinical.org/aisp_iliad.html), which now covers 1500 diagnoses based on thousands of findings, the Dxplain system (http://lcs.mgh.harvard.edu/projects/dxplain.html), which has a database of crude probabilities for 4,900 clinical manifestations that are associated with over 2,200 unique diseases, and SimulConsult (http://www.simulconsult.com/), which is widely used by pediatric neurologists in the US, and by the end of 2010 covered some 2,600 diseases in neurology and genetics, taking its data from peer-reviewed medical literature.

BBNs can be constructed using structured data, or when this is unavailable, through literature review or expert elicitation. Typically this task requires a considerable amount of human effort, which may be impractical on a large scale. As a consequence, there is a clear need for a system which allows an automated extraction of the relevant probabilistic information, including both dependence and independence information and quantitative probabilistic information, as well as offering authoring capabilities, to facilitate the building of BBNs.

BRIEF SUMMARY

There is provided, in one aspect, a BBN authoring system and method for constructing Bayesian Networks from texts including extraction and aggregation of probabilistic and structural information into a consistent and meaningful BBN.

To this aspect, the BBN authoring system and method for constructing Bayesian Networks from texts provides authoring features allowing a user to interact, edit and update results obtained during one or more processing stages.

The Bayesian Belief Network (BBN) authoring system comprises: one or more content sources providing content; a programmed processing unit for communicating with the content sources and configured to: access text content stored in a content storage device; identify statements within the accessed text content indicating a probabilistic dependence relation; extract the statements indicating the probabilistic dependence relation from the text content; and aggregate the extracted statements to form a BBN network structure.

In this embodiment, the text content includes text units, the processor device is configured to: parse each of the text unit to generate a directed typed-dependency graph structure, the graph structure having nodes associated with words of the text unit, and the nodes being interconnected and associated with a label denoting a grammatical relation among the nodes; and, obtain a set of typed dependencies among nodes from the directed typed-dependency graph structure.

Furthermore, the system identifies statements indicating a probabilistic dependence relation, the programmed processing unit is configured to: identify one or more lexical and semantic attributes of words within a text unit indicating a probabilistic dependence relation between two or more variables; and add identified typed dependencies based on the identified word attributes to the set of typed dependencies obtained from the directed typed-dependency graph structure.

A computer program product is provided for performing operations. The computer program product includes a storage medium readable by a processing circuit and storing instructions run by the processing circuit for running a method. The storage medium readable by a processing circuit is not only a propagating signal.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which.

DETAILED DESCRIPTION

The present disclosure provides a system and method to facilitate the authoring of Bayesian Belief Networks, using automated extraction from text. One target user of such a system is a domain expert or an analyst, for example, who seeks to build a probabilistic model articulating how random variables are dependent among one another.

The system includes a generation component and a user interface that optionally enables the user to interact with the process for building a BBN. Input to the process consists of texts or existing BBNs, which will first be processed into building blocks and then aggregated into a "BBN" (or "network").

Depending on the type of input, the process involves (i) extracting dependence relations between random variables, (ii) aggregating such relations into a valid network structure (in particular avoiding cycles), (iii) extracting/identifying quantitative probabilistic information associated with the random variable, and (iv) to reconcile this probabilistic information with the network structure.

The methods included in the system seek to automate or partially automate this process so as to reduce time and labor.

In one embodiment, the system and methods includes the automatic extraction of evidence statements from texts (representations of sentences indicating a dependence relation), which can be aggregated into dependence relation statements, and further aggregated into a BBN structure. This structure is then partially populated with conditional probabilities based on the quantitative information extracted from the inputs.

Both the resulting BBN structure and populated BBN model can be updated and expanded upon processing more documents and/or following authoring guidance, e.g., from a user.

In the system for facilitating authoring of a BBN using automated extraction from text, an authoring environment for Bayesian belief networks is provided that includes a generation component that creates an initial version of a Bayesian network, and includes a user interface that allows, among other things, the network to be edited by a target user, e.g., a domain expert, together with logic to determine the consistency of the network such that the generation of cycles in the BBN graph (a directed acyclic graph) is avoided.

In one embodiment, a framework for building BBN from text is provided.

Figure 1:
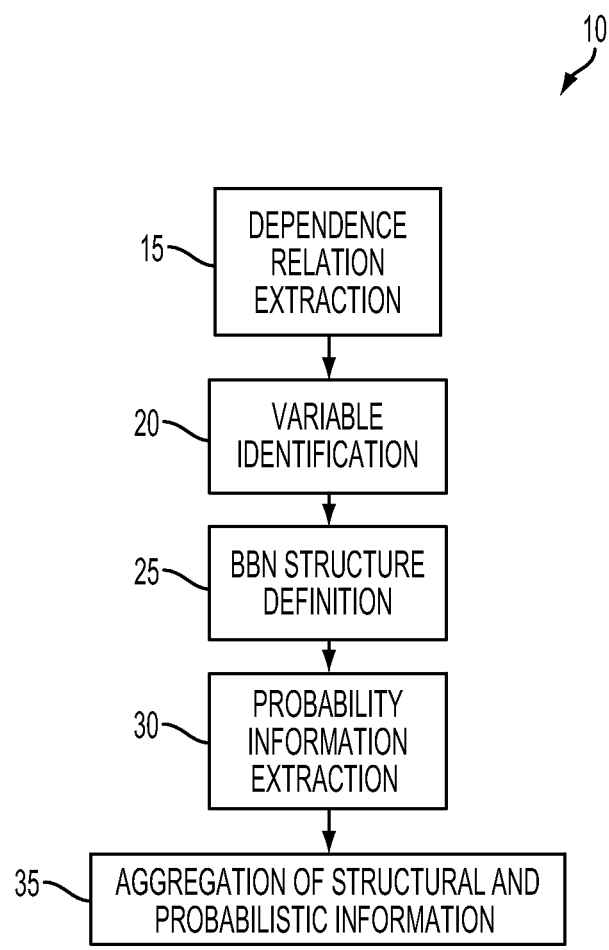
FIG. 1 depicts one embodiment of a processing sequence comprising a framework 10 for constructing a BBN.

There are two main layers to the BBN. First, a graphical layer is composed of nodes and edges, which represent the structure of the BBN. Second, the quantitative layer includes the conditional probability tables of each of the nodes. Because the elements of the quantitative layer depend on the graphical layer—the structures of the conditional probability tables depend on the parents of each node—it is necessary to determine the structure of the BBN before populating it with quantitative information. FIG. 1 shows a processing sequence comprising a framework 10 for constructing the BBN:

Dependence relation extraction 15: One starting point of the computer-implemented process includes processing the source text to extract information about dependence relations. The output of this step is a list of extracted relations along with additional features, such as: the credibility of the source, the author's affiliations, the journal from which it was extracted, the year of publication, the type of analysis that was performed.

Variable identification 20: Next, the process continues by defining the variables/nodes based on the terms involved in the identified dependence relations. In one embodiment, functions are provided to cluster the terms and to identify a representative term for each cluster. The output of this step includes a mapping of terms to a representative term, which corresponds to the variable. The granularity of the clustering, i.e., whether to create a variable either for each type of cancer or group several types together, is partially a modeling choice of the user based on the set of concepts that the user is interested in. The concepts (and clustering granularity of a node variable) may be specified by a user via a user interface to a computer system. The definition of variables and nodes further depends on the type of text considered; for example, technical texts such as academic papers typically contain finer distinctions than popularization texts. Therefore, at this point, the user may be involved, at least for confirmation of the output.

BBN structure definition 25: Further processing includes computer-implemented steps for creating the structure of the BBN by aggregating the dependence relations and orienting the edges identified. Methods associated with these tasks include, but are not limited to: evaluating the credibility of each dependence relation, determining whether the dependence stated is direct or indirect and ensuring that no cycle is created in the process of orienting the edges.

Probability information extraction 30: Further processing includes extracting from a text corpus any information about probability or likelihood of variables. In one embodiment, the methods implemented include identifying both numerical information such as "75% of longtime smokers will develop lung cancer in their lifetime" and for qualitative statements such as "Smoking increases the chances of developing lung cancer". Beyond probability extraction (whether a number or a qualifier), the terms are mapped to a well formed probabilistic statement, $P(A=a|B=b)=x$ which typically is composed as probability of a given sets of variables (A) being in some specified state (a) given another set of variables (B) is in a specified state (b).

Aggregation of structural and probabilistic information 35: Next, the process performs the aggregation in a consistent manner of the information gathered so as to obtain a fully defined BBN. This step may be carried out automatically, as computer-implemented steps or, manually by the user, or both. Specifically, this processing involves rigorously combining conflicting and partial information about the probabilities with the structure defined in the third step.

Figure 2:
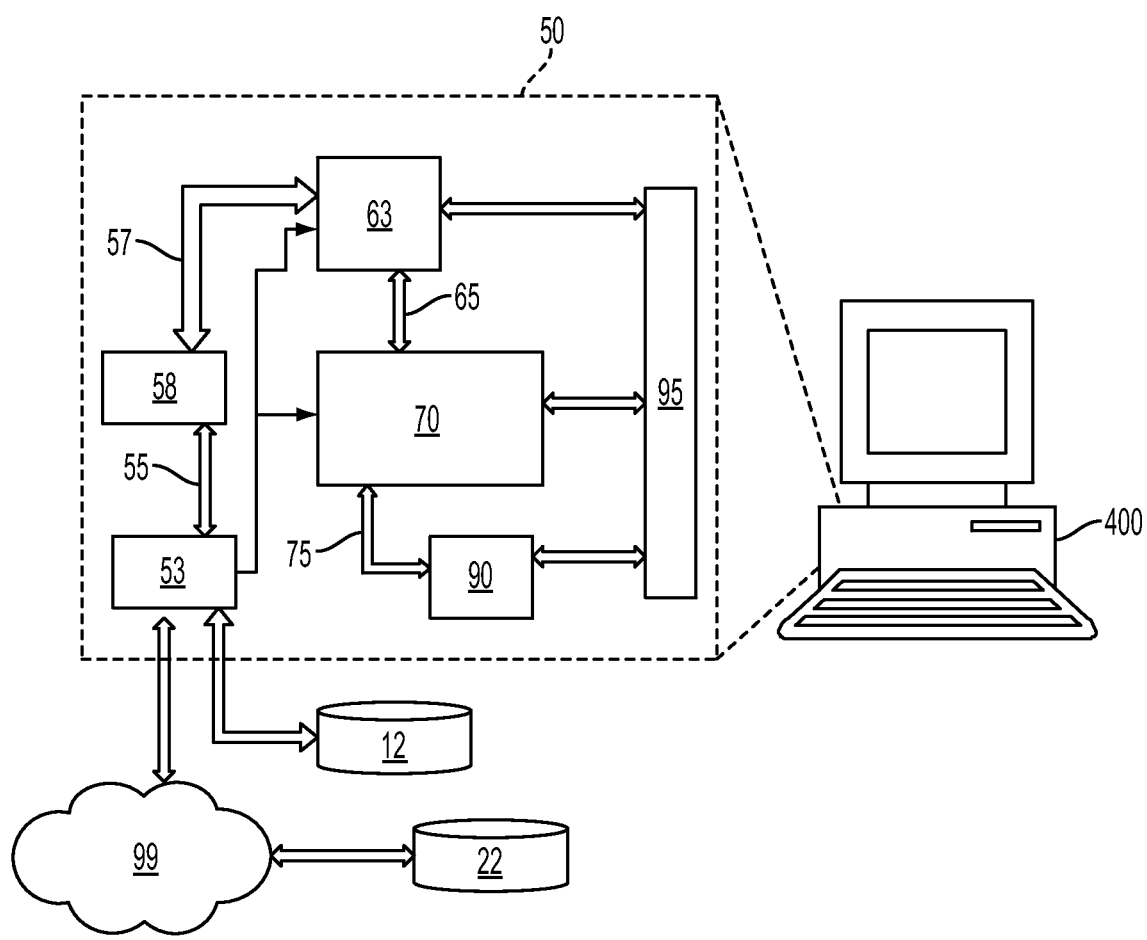
FIG. 2 depicts an embodiment of an authoring system 50 for generating a BBN from text according to the processing framework shown in FIG. 1.

Referring now to FIG. 2, an authoring system 50 for generating a BBN from text according to the processing framework shown in FIG. 1, is shown. As seen in FIG. 2, the system 50 may comprise: a receiving element 53 to receive text 55, e.g., from documents stored in and accessed from a local connected memory storage device, e.g., database, corpus and/or knowledgebase 12. Via a network interface device, text may be received from a remotely located memory storage device, e.g., a database, corpus or and/or knowledgebase 22 over a communications network (e.g., a local area network, a wide area network, a virtual private network, a public or private Intranet, the Internet, and/or any other desired communication channel(s)) 99; a syntactic parser element 58, e.g., the Stanford parser, in operative communication with the receiver element 53, is configured to process the input text 55 producing a digraph structure of "typed dependencies" and provides typed dependency information 57 in a compatible form. To make the typed dependencies usable, the system may further optionally filter or eliminate parts of the original "typed dependency" graph that aren't useful to clarify the underlying argument structure.

In a further embodiment, certain information is saved for later use in later processing stages. Thus, a processing module 63 is configured to automatically augment, with additional information, the original typed dependencies created by the Stanford Parser. For example, additional information in the form of additional typed dependencies may represent semantic information automatically derived from a table of lexical information. This table of lexical information may be accessed from a local or remote memory storage device 12, 22. The additional typed dependency information may further include information concerning the datatype of certain kinds of tokens, such as numbers or intervals. This additional typed dependency information 65 becomes new graph elements that will be added to the graph elements resulting from the dependency parse information. A union of the additional typed dependencies and original typed dependencies from the parse is used to produce the final semantic representation (an "evidence statement"); however, this representation may be subject to further linguistic processing, and specifically the application of transformational rules to the dependencies.

The graph with additional dependencies 65 is input to a processing module 70 for creating evidence statements 75, which are statements that will be used to create the BBN. These statements 75 specify information extracted from the text, such as variables and the relationship between them, and modifiers governing a variable, a relation, or the assertion as a whole. Information added to the original dependency graph in order to facilitate the syntactic analysis, such as argument order, is utilized and persisted in memory for later use if needed. The processing methods further implemented at module 70 include adding additional information to the evidence statements from external sources. These external sources may include a knowledgebase of a particular domain, such as a medical domain database (e.g., UMLS® (Unified Medical Language System) Metathesaurus), e.g., that provides alternative names for the variables, including a preferred name, if known; related concepts; supertypes, etc.

For an example medical domain application implementing a UMLS knowledgebase, further use may be made of the SNOMED® (Systematized Nomenclature of Medicine) taxonomy. Thus, in one embodiment, variables are variables using concepts rather than natural language terms and accessing this taxonomy provides extra information. For example, the SNOMED taxonomy could be used to suggest generalizations. For example, if tamoxifen is effective against breast cancer, and taxomifen is an anti-estrogen, it's logical to query the BBN to see if other anti-estrogens are also effective. This kind of functionality does not belong in the BBN itself, but rather would reside in a query facility on top of the BBN.

As more than one evidence statement 75 may refer to the same pair of variables and the same relation, a processing module 70 is configured for consolidating similar assertions; reconciling conflicting assertions; and assigning probabilities. In one embodiment, this is performed automatically by computer-programmed processes. For example, as will be explained in greater detail herein below, in arbitrating among conflicting assertions, judgments may be made on the basis of a kind of weighted voting, and assigning confidence levels to individual assertions. The assigning confidence levels may take into account considerations such as the year of the (text) publication, and, if available, a rating of the journal it appeared in, the authors, and so on. Via a user interface 95, a domain expert may be able to edit the evidence statements and to make judgments on how they may be consolidated.

A further network aggregation module 90 is provided that, during a network aggregation stage, automates creating the BBN network structure from evidence statements 75. Network aggregation module 90 include processes that include populating the probabilities underlying the network structure, and provide an interactive process involving both user input via interface 95 (e.g., a Java based software interface) and automatic computation and consistency checks.

That is, an interface 95 is in operative communication with each of the BBN generator system components 50 provides a visual outputting element (such as an interface display screen or the like) and/or an audio outputting element (such as a speaker or the like). More particularly, it is via user interface 95 that enables a user to control, validate (and through feedback, improve) the inputs generated by the natural language processing steps and the aggregation methods that are used to create the BBN structure and populate it with probabilities.

In one example, any steps may be carried out in the order recited or the steps may be carried out in another order.

Figure 10:
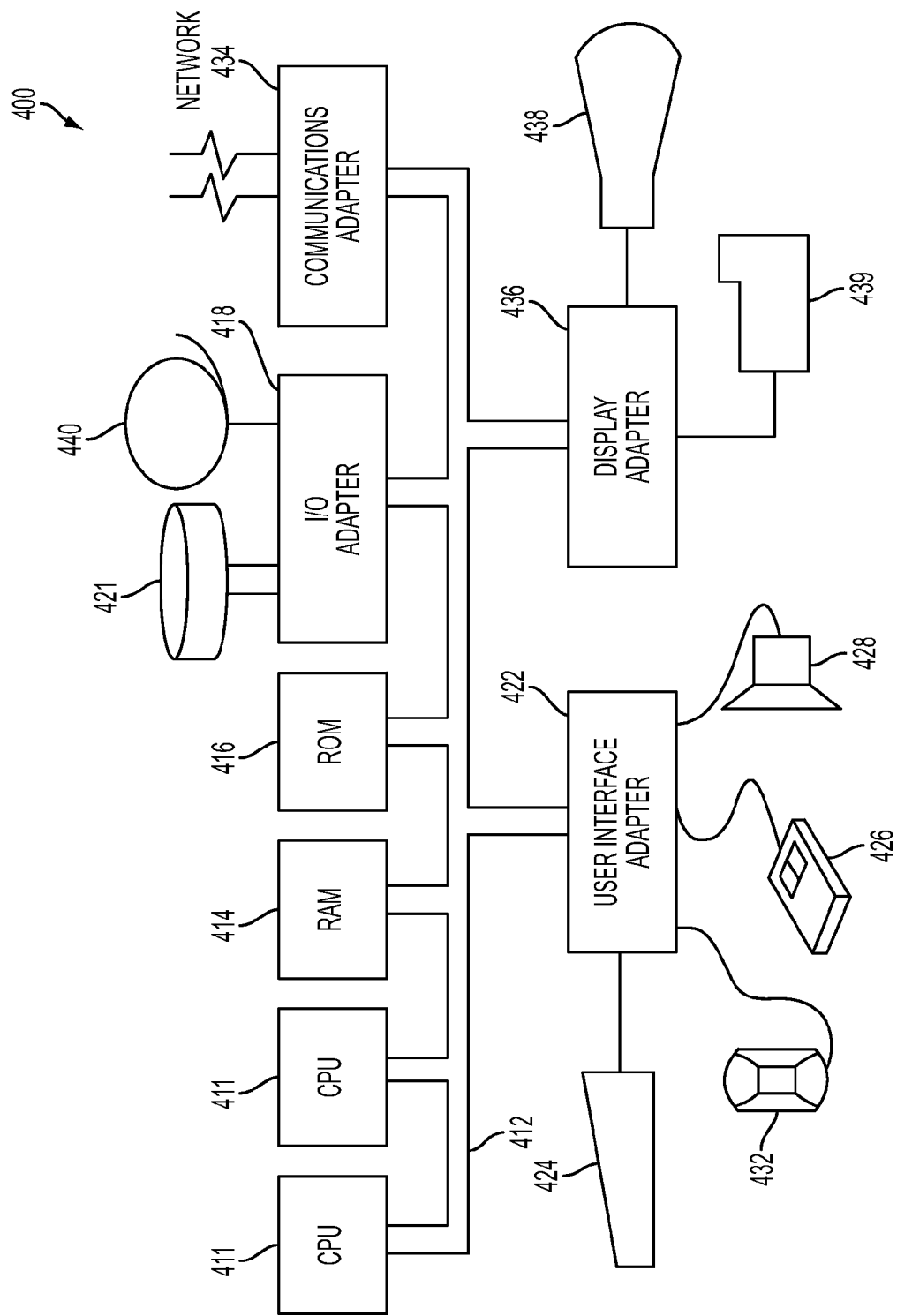
FIG. 10 illustrates one embodiment of a hardware configuration of a computing system 400 employing the system of FIG. 2 and methods of FIGS. 1 and 3-5.

In one embodiment, some or all of the elements of FIG. 2 including user interface for the authoring system 50 may be implemented in a computer system 400 of the type shown in FIG. 10. Further, any element may be in operative communication with any other element(s).

Figure 3:
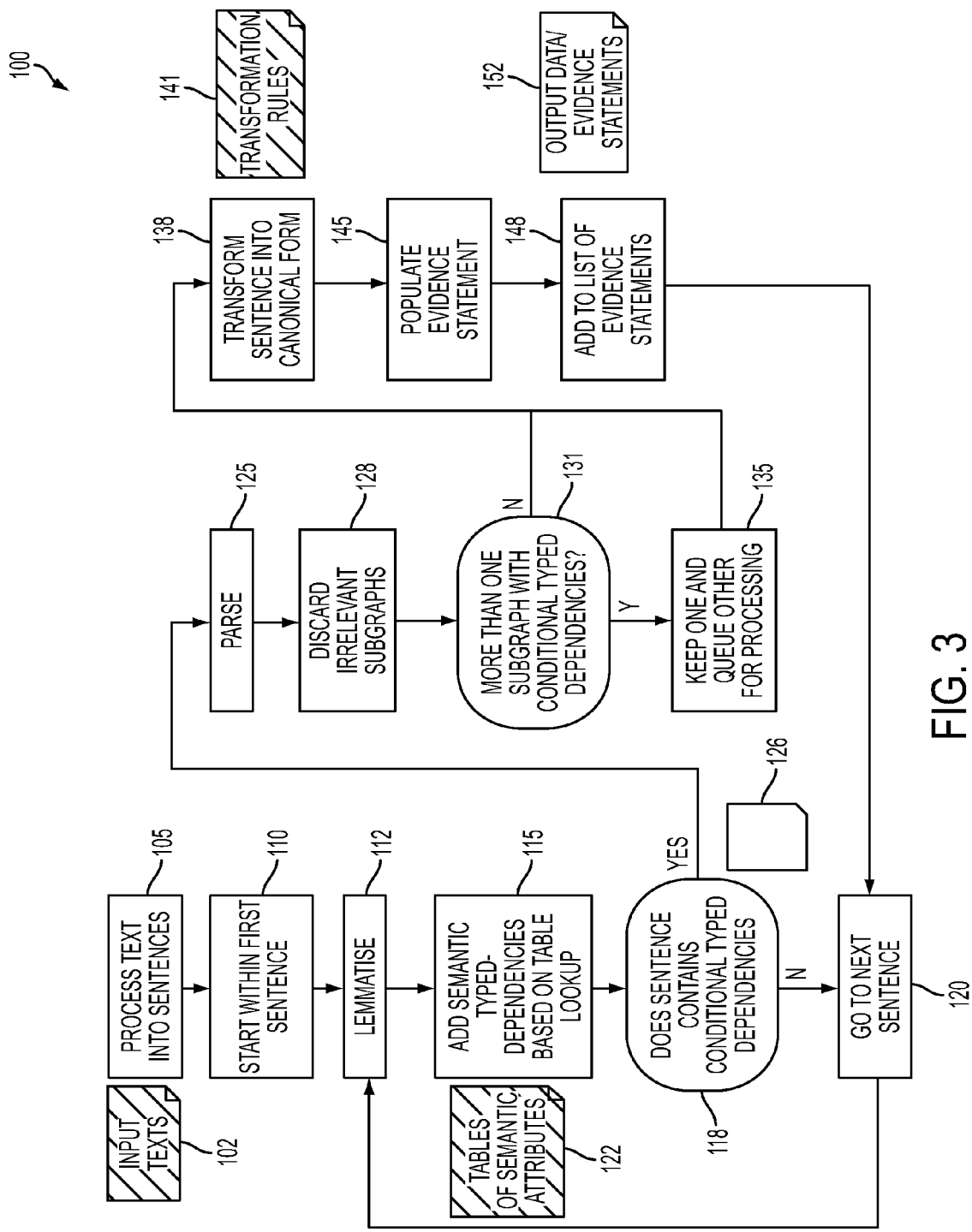
FIG. 3 depicts a method 100 to automatically generating evidence statements in the framework for generating the BBN in one embodiment.

Referring now to FIG. 3, there is depicted a method 100 to automatically generate evidence statements in the framework used for generating a BBN from text as performed in the system of FIG. 2. At a first step 102, text, e.g., documents, from the corpus or database, in electronic digital form, is provided as input to or accessed by system 50. Initially, at 105 the text is pre-processed into sentences, and a processing loop entered at 110 where a first sentence is identified for processing. The process loops through each of the sentences in a document and includes at 112, lemmatizing the sentence, e.g., finding a base form of inflected words (e.g., associating a base word with a word that has many morphological variants, e.g., cause, causes, causing, caused, etc.) of the text in a manner so they can be used in table look-up step when determining conditional relations and annotating the text with semantic attributes and relation information from the lexical tables at 115.

For example, the sentence "Smoking causes lung cancer" may be lemmatized and rendered in base form to set forth terms "smoke", "cause", etc., which term "cause" is determined via table look up as an expression of conditional dependence.

As mentioned, processing module 63 of the authoring system 50 is configured to automatically augment, with additional information, the original typed dependencies created by the Stanford Parser, for example. The original typed dependencies produced by the Stanford Parser, or whatever alternative is used to produce the typed dependencies, include parts of speech including, but are not limited to: nsubj (noun subject); dobj (direct object); prep (preposition), etc., and as known, may be parser dependent. As further part of the parsing process it is understood that the basic linguistic technique of tokenization is performed in which the syntactic parser, e.g., Stanford Parser, implements functions for breaking a sentence up into elements, for example for purposes of parsing. The detailed syntactic analysis is necessary to identify variables, relations, and modifiers in text, and this hinges on the identification of roles such as subject and direct object of a sentence.

The additional information added to the graph at 115, FIG. 3, may include semantic information derived from one or more stored table(s) 122 of lexical information. In one embodiment, the tables of lexical information are accessed and used to add information to the typed dependencies, in the form of new additional typed dependencies.

This semantic information is used for the creation of evidence statements by a later transformation process according to a grammar implemented as transformation rules.

In one embodiment, a type of additional information added at 115 may include: Argument structure adapters. These are used to identify the arguments that are needed. For example, in "Fulvestrant's binding leads to rapid degradation and loss of ER protein," it is desired to identify "rapid degradation and loss of ER protein" as a dobj (direct object), but the syntactic parser sees it as the object of the preposition (pobj) "to." Thus, the method includes providing a transformation to enable the grammatical relationships to map one to the other. As will be described in greater detail herein below, one of the roles of the transformational grammar is to map grammatical relationships expressed in the typed dependencies to ones that express the argument structure in the way expected. For example, it is expected that the argument structure be expressed as it would be in a simple declarative sentence, say "Smoking causes lung cancer," where the first argument corresponds to the subject, and the second argument to the direct object. Another linguistic variant less expected (to take a trivial example) would be "Lung cancer is caused by smoking", and the transformational grammar is the part of the system that deals with such linguistic variation, and puts the typed dependency graph into a standard form.

A further example might be presence of words "given" or "increases," as in "The risk of lung cancer given smoking increases by 12%." Here, typed dependencies generated tell us that (a) the argument order is reversed from the canonical one—if "A causes B" is the standard order, then the argument order has to be switched to get "smoking . . . lung cancer" rather than "lung cancer . . . smoking", and that (b) "increases by 12%" means that the risk becomes greater, rather than staying the same or getting smaller. Thus, two additional typed dependencies are generated, which have different uses in the system. The first is significant to the transformational rules and will lead to changes in the tree. Specifically, the first typed dependency will trigger a rule to represent the arguments in a standard order, representing the first argument as an nsubj, and the second as a dobj. The second typed dependency carries information (the directionality implied by "increase") that will be transferred to the evidence statement.

In one embodiment, during the process of reading an input text document and adding of lexical information based on table-look-up at step 115, information identifying the document (e.g., citation, its internal location for later presentation to the user) is stored in a master document table 126 of all processed documents. The processing loop through the sentences in the document beginning at step 110 is entered. In one embodiment, reading the document may be restricted to parts of the document, e.g., by section of the document.

Lexical information—semantic typed dependencies—are identified at 115, using the look-up tables 122 of lexical information which information is encoded in the form of additional typed dependencies.

It is understood that table look up generates the additional typed dependencies, e.g., looking up word "cause" in "Smoking causes lung cancer" expresses probabilistic, e.g., conditional, dependence. Some words can give rise to more than one typed dependency. That is, in effect, the typed dependencies generated by lexical lookup are a way of representing attributes, and an element may have more than one attribute.

Continuing, to 118, FIG. 3, a decision is made as to whether to extract the current sentence being processed includes an expression indicating a conditional dependency. If at 118, it is determined that the current sentence being processed does not include a conditional dependency relation, the process at 120 retrieves the next sentence of the document to process, and returns to lemmatizing step 112 and the processing loop repeats for the each sentence of the document, or document section to extract those sentences from the documents expressing conditional dependence. Otherwise, for the current sentence if one of the typed dependencies denotes conditional dependence, then the sentence is passed on to the syntactic parser in a next processing stage at 125. Further, if the sentence is in fact to be passed on, there is added the source of the sentence in the text referred to by the master document table 126.

Continuing in FIG. 3, the sentence including the term or word expressing conditional type dependency is parsed by the syntactic parser at 125 and a typed-dependency graph is generated. The typed dependencies generated during lexical processing are added. The typed dependency graph is broken down into referentially self-contained subgraphs, purely by manipulating the graph; those subgraphs are processed separately.

For example, even if a sentence contains a dependence relation, not all clauses are relevant. For example, a nonrestrictive relative clause is self-contained, while a restrictive relative clause is not. (A restrictive relative clause modifies the meaning of its head nominal. For example, in "the house that Jack built" the relative clause, "that Jack built," restricts the meaning of "the house"—if there is a set of houses, there would only be interest in the ones that Jack built. In contrast, in "the house, which is ugly," which is ugly" is basically a side comment—it isn't really intended to help one pick out the house from the set of all houses.)

In one embodiment, if a sentence does include a nonrestrictive relative clause, it may be extracted from the sentence before processing the main clause. The extraction may occur regardless of what the nonrestrictive relative clause is. But that doesn't imply that the clause that is removed is not of potential interest. Thus, in one embodiment, the main and extracted clauses are processed separately. For example, having processed the main clause, the nonrestrictive relative clause is then processed, which may or may not contain useful information. For example: "Vitamin C deficiency, which is known to cause scurvy, may increase the risk of cancer." Here, there are two useful statements, that Vitamin C deficiency may increase the risk of cancer, and that Vitamin C deficiency causes scurvy.

The processing loop 112-120 is run by the system 50 in the dependence relation extraction stage of the framework to process sentence units of a document (article or a body of documents from articles) to identify sentences expressing probabilistic dependence from which information will be extracted. An example of a sentence expressing probabilistic, e.g., conditional dependence is:

"The odds of contracting lung cancer increase to 37.5% if you smoke" or

"Smoking greatly increases the risk of lung cancer."

In FIG. 3, such a sentence is parsed at 125 by a syntactic parser, e.g., the Stanford parser, to produce a typed dependency graph, or similar linguistic representation which encodes roles such as subject or direct object and relationships among elements via a directed acyclic graph.

The additional semantic information is added to the graph (generated by syntactic parser) by the table look up of the base forms of lexical items in the sentence. In the above examples, "increase," as opposed to "decrease," has a positive polarity—the odds get bigger, not smaller. This information is recorded by creating a new typed dependency representing polarity=positive and linking it in the graph with the typed dependency representing "increase."

As a given sentence may contain more than one assertion about probabilistic dependence, in order to ensure treatment of just one such statement at a time, the parser output graph may be broken up into subgraphs, as appropriate, and process them separately. Otherwise, for example, at 128, it may be determined that an irrelevant sub-graph (e.g., corresponding to extracted restrictive relative clauses for separate processing) which may end up being discarded or otherwise extracted from the parser output graph.

Continuing to 131, a determination is made as to whether the syntactic parser output includes more than one subgraph for the current extracted sentence. If so, each sub-graph is processed one at a time and at 135, a subgraph(s) remaining on a processing queue until a current subgraph is processed by transformational parser at 138 and subject to transformational rules. For example, in one embodiment, via application of transformation rules 141, the sentence is transformed in a canonical form.

For example, natural language has incredibly diverse ways of expressing the same idea. To take a simple example, both "John loves Mary" and "Mary is loved by John" have the same semantic content.

Consider also how many sentences could be formed to express "The odds of contracting lung cancer increase to 37.5% if you smoke," and how far from straightforward it is to process that sentence in particular. In order to understand sentences, a level of linguistic analysis is performed that maps them to a uniform representation in which the semantic relationships are expressed in a standard way. This is done by applying transformational rules to the parser generated/augmented dependency graph, so that, for example, the graphs for "Mary is loved by John" and "John loves Mary" become the same.

Thus, given the augmented typed dependencies, the step 138 includes applying transformations to map them to a form which puts their argument structure into a canonical form, easily interpretable by the evidence statement generation module 70 (FIG. 2), and free of linguistic variations. A transformation is a rule to change the typed dependency graph.

In one embodiment, the transformations are stated as rules as the rules are concise, and can be implemented in a highly efficient way by a rule interpreter component. For example:

1) each rule would consist of a pattern plus a set of operations, as exemplified by the following example:

```
Rule: rc_subj
Pattern:
    dep1 = ref(subj1,pronoun1)
    dep2 = nsubj(verb1,pronoun1)
Change:
    add nsubj(verb1, subj1)
    delete dep1
    delete dep2
```

2) The rule pattern needs to enable the setting of variables and use them to apply operations. A variable can refer to: (a) a tuple, or (b) an element of a tuple. Two occurrences of the same variable within a pattern must refer to the same element; and 3) Operations on the tuples include, but are not limited to: (a) insertion of typed dependency, (b) replacement of a typed dependency or an element of a typed dependency, and (c) deletion of typed dependencies.

As a simple example, given the statement: "Smoking causes cancer," a syntactic parser such as the Stanford Parser produces the following constituency parse:

```
ROOT
(S
    (NP (NN Smoking))
    (VP (VBZ causes)
        (NP (NN cancer)))
    (. .)))
```

From this is derived a dependency parse:

```
nsubj(causes-2, Smoking-1)
root(ROOT-0, causes-2)
dobj(causes-2, cancer-3).
```

The above elements (nsubj(causes-2, Smoking-1), and so on) are typed dependencies reducing the constituency parse to a graph of grammatical relations where all the nodes in the graph correspond to words in the original sentence including grammatical relationship such as subject and object (The "type" in typed dependency is, for example, nsubj or dobj; each word is concatenated with an index representing its position in the sentence, as in causes-2, just to make sure the node names are unique . . . ).

This being a directed graph, then, for example: nsubj (causes-2, Smoking-1) means that in the graph causes-2→Smoking-1, where nsubj is a label on the arc. That is, "smoking" is the subject of "causes." Most often the directed graph will be a tree, like the one that the typed dependencies are derived from, but in some rare instances, it may not be.

Then, looking at conditional dependency (at a statistical level, not a linguistic one) in generating the BBN, a relation smoking→cancer is created. Here "smoking" and "cancer" are no longer words in the sentence; they're being treated as the names of random variables in a completely different domain. In this example, mapping from the linguistic level to the statistical one is accomplished as follows: the subject of the sentence maps to a random variable on the left of the arrow, and the direct object to a variable on the right of the arrow.

Thus, BBN is generated from a linguistic domain (which does not have variables) to the statistical domain, which does have variables. The generated evidence statement provides such an intermediate representation which includes the necessary information for the BBN generation. Thus, it is necessary to ensure that there is, in fact, a subject that represents the BBN variable on the left and a direct object which represents the variable on the right. There is a huge variety of possible sentences, however. To take another example, the same statement "Smoking causes cancer" may be stated as "Cancer is caused by smoking." This would lead to the following typed dependencies:

```
nsubjpass(caused-3, Cancer-1)
auxpass(caused-3, is-2)
root(ROOT-0, caused-3)
agent(caused-3, smoking-5).
```

In one embodiment, the transformations are specified by rules, which are interpreted by a rule interpreter (not shown). One example of a rule for the above construction is:

```
/**
  Change a simple passive construction to an active one.
*/
Rule: passive_to_active1
Pattern:
  dep1 = nsubjpass (verb1, object1)
  dep2 = auxpass(verb1, *)
  dep3 = agent(verb1,subject1)
Change:
  add nsubj(verb1, subject1)
  add dobj(verb1, object1)
  delete dep1
  delete dep2
  delete dep3
```

This will map

```
nsubjpass(caused-3, Cancer-1)
auxpass(caused-3, is-2)
root(ROOT-0, caused-3)
agent(caused-3, smoking-5)
``` to

```
nsubj(causes-2, Smoking-1)
root(ROOT-0, causes-2)
dobj(causes-2, cancer-3)
```

A set of such rules is called a "transformational grammar" and such rules perform other functions in the system than just sorting out argument structure in this way.

Continuing next to FIG. 3, at 145, the transformed typed dependency graph is used to create an evidence statement, which identifies the components of a dependence relation—the random variables and their relationship—plus any relevant modifiers. The evidence statement also includes the semantic information added at an earlier stage via lexical look up, plus any attributes that may have been added by applying transformational rules. It further includes a pointer back to the part of the source document that contained the original sentence. Thus an evidence statement is a semantic representation of the sentence, and refers back to the source text.

Evidence Statement Generation

Evidence statements are generated from the transformed typed dependency graph. The transformations have previously structured the graph so that, regardless of the initial assignment of grammatical category, a probabilistic dependency A==>B (e.g. "smoking causes lung cancer") is represented by a typed-dependency graph in which the first argument ("smoking") is a typed dependency, e.g., labeled as an nsubj, meaning a grammatical subject, and the second argument ("lung cancer") is labeled as a dobj, meaning a direct object. In addition, a relation has been identified ("causes").

Each of these elements may have modifiers that are relevant to the creation of the Bayesian network. For example, in "Smoking increases the probability of lung cancer by 25%" there is included the information that, whatever the prior probability of lung cancer is, smoking will increase that probability by 25%. The initial parse may not itself contain this information; rather all it informs is that there are a number of uninterpreted symbols—"smoking," "increases," and so on—and that some of them are nouns, one is a verb, one is a preposition, and so on, and that they bear a particular grammatical relationship to one another.

This information has been provided by lexical look up, and additional information may have been provided by the transformations.

An evidence statement encodes such information—what the arguments (i.e., random variables) are, and how one affects the probability of the other—for use in generating the Bayesian network. As noted, the transformations have put the graph into a canonical form such that a first random variable is the nsubj of the graph, and the second is the dobj, so the evidence statement generation simply transfers that information. In this example, there is a relation ("increases the probability . . . by 25%") that carries very specific information. While the relation itself will not be represented directly in the Bayesian network, the module 90 that generates the network and is in charge of populating the probabilities underlying the network structure will certainly need to know it.

Figure 4:
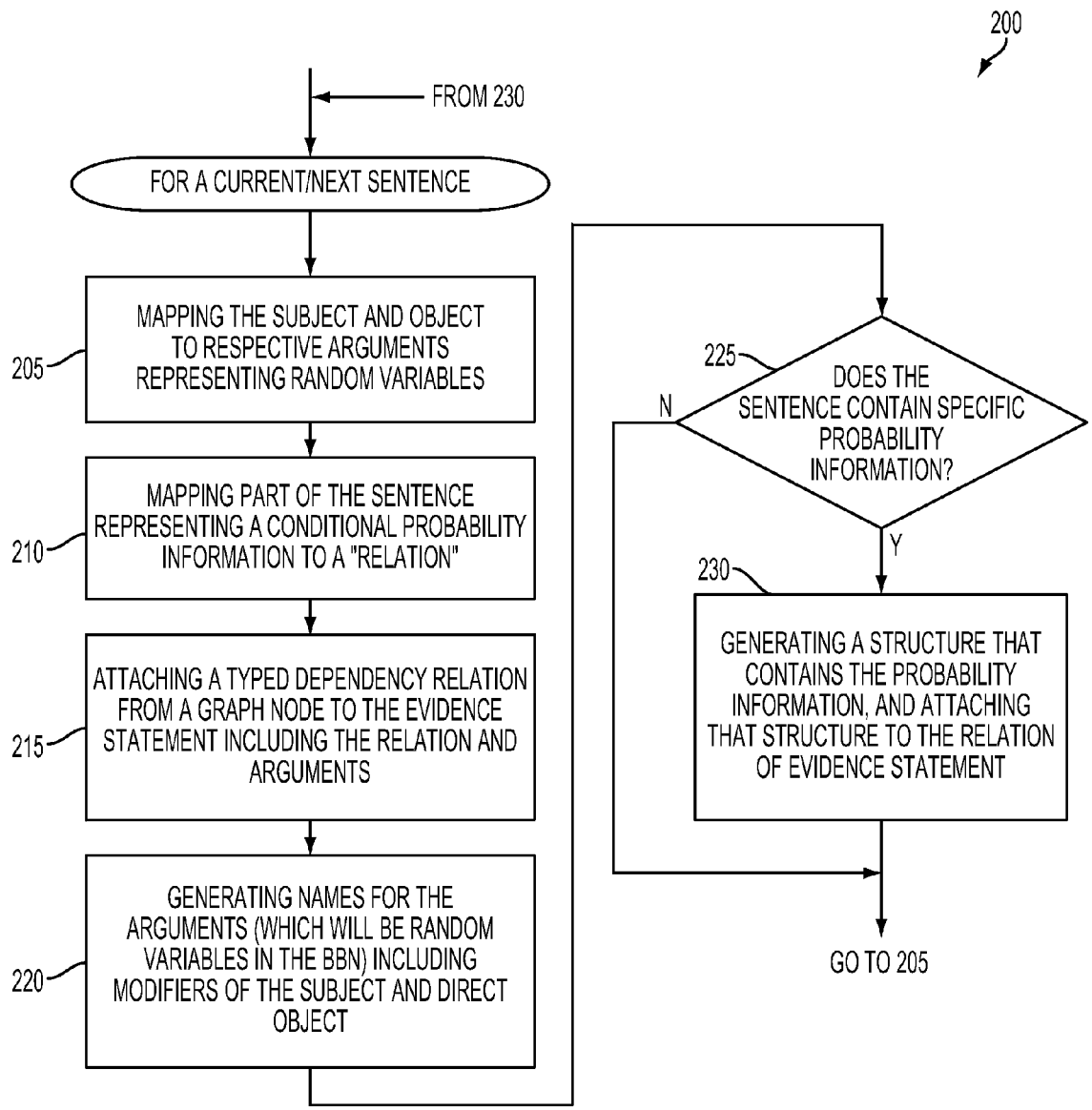
FIG. 4 depicts a further method 200 for automatically generating the evidence statement indicating a probabilistic dependency relation between random variables.

Specifically, as shown in FIG. 4, the evidence statement generation performs tasks 200 including, but not limited to, in no particular order:

1. Mapping the grammatical subject and object of the sentence to "argument 1" and "argument 2," respectively, representing random variables at 205.

2. Mapping the part of the sentence representing a conditional probability information to a "relation" at 210.

3. The lexical processing and application of transformational rules have introduced additional typed dependencies that carry semantic information, and at 215, FIG. 4, they are attached in the graph to the appropriate elements. These additional typed dependencies that carry semantic information are transferred to the parts of the evidence statement representing the two arguments and the relation.

4. Generating names for the arguments (which will be random variables in the Bayesian network later generated from the evidence statements) from the typed dependencies, including modifiers of the subject and direct object at 220. For example, a term name might be as simple as "smoking" but might be much more complex, depending upon the modifiers. In the example described herein, a term name "lung cancer" is constructed by attaching the modifier "lung" to the object "cancer."

5. Determining at 225 whether the sentence contains specific probability information, whether precise or imprecise, and if so determined, generating at 230 a data structure that contains the information, and attaching that structure to the relation. In one embodiment, a data structure including probability information is represented as a Java class that contains methods that do some active computation as well as containing data. This has been seen for the precise probability expression "increases the probability of lung cancer by 25%." An imprecise probability expression such as "greatly increases the chances of lung cancer" is treated similarly, using semantic tags rather than actual numbers. It is understood that probability extraction may be performed in parallel.

If no specific probability information is found as determined at 225, the process retrieves the next sentence and returns to step 205 to repeat the process steps 205-230 for generating the next evidence statement.

6. In a further embodiment, as the sentence may contain more than one subject or more than one object, the evidence statement generation method 200 of FIG. 4 may include further processing steps to create separate evidence statements for each direct object. For example, "Smoking causes bronchitis and lung cancer" will be treated as separate statement "smoking causes bronchitis" and "smoking causes lung cancer." In the case of more than one subject, there is potential ambiguity: human beings understand that "Drinking and driving causes accidents" intends that drinking in conjunction with driving causes accidents, and not drinking alone or driving alone, while for "Smoking and drinking shorten one's lifespan" is meant that smoking is unhealthy and so is drinking. If the sentence explicitly states that the various subjects need to be considered together, they will be treated as such in evidence statement generation, and otherwise separate evidence statements will be generated for each subject.

At 148, FIG. 3, the formed evidence statement 75 is added to a list of evidence statements at 152 which list may be output for use in generating the BBN network. Once all the sub-graphs of the typed dependency graph for the current sentence is processed to generate evidence statement, the process returns to 120, FIG. 3 where the next sentence is processed and the processing loop entered at 112 where the process for extracting sentences and generating evidence statements repeats.

Evidence statements on the same random variables can be aggregated into relation statements by the network aggregation module 90, FIG. 2. While evidence statements are a semantic representation of sentences, relation statements indicate probabilistic dependence (and sometime independence) between random variables, and can be aggregated to form a BBN structure during the BBN structure aggregation phase, followed by a probability extraction/reconciliation phase, which altogether lead to the creation of a fully defined BBN. Network aggregation module 90 may include an interactive process involving both user input and automatic computation and consistency checks.

A BBN is then created from the evidence statements by network aggregation module 90, using related concepts as a guide to organizing the display of the network and the BBN system generating component will generate the graph in a particular language. That is, in one embodiment, the BBN generator provides a Java interface 95, with different implementations for RDF (Resource Description Framework), EMF (Eclipse Modeling Framework), or other implementations.

Figure 5:
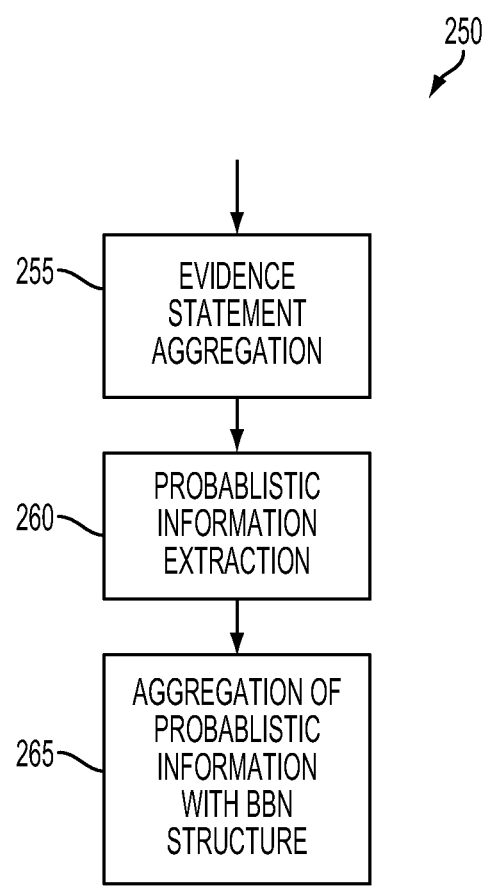
FIG. 5 illustrates a methodology 250 for BBN creation according to an embodiment.

FIG. 5 illustrates a methodology 250 for BBN structure aggregation according to an embodiment.

In this embodiment, the system and method first performs at 255 aggregating the evidence statements into a BBN. The aggregation of evidence statements about dependence relations commences by obtaining a set of evidence statements, each statement, for example, involving (but not limited to) two variables which are referred to as A and B, and additional optional information, including but not limited to one or more of: polarity, modifier, publication year, authors, etc. Example ways to aggregate this information into a BBN structure, i.e., into a directed acyclic graph capturing dependence and independence information among random variables, include:

1. Reconciling statements involving the same pair of variables A and B. In this embodiment, a majority vote is implemented including, counting the number of statements about dependence and independence and creating an output statement about the most numerous category (dependence or independence). This further includes: modulating the reconciliation process by adding weights to each statements, weights being determined by additional information such as modifiers (e.g., higher weights for cue terms such as significantly, definitely and lower weights for terms such as may, possibly, could), publication year of the paper (higher weights for more recent papers) or any other information. In a further embodiment, a user could, via a user-interface such as a display device, be prompted to build his/her own weighting schemes, either through functional forms or providing weights for each statement directly.

For example, given the following three illustrative statements involving Var A: breastfeeding and Var B: breast cancer.

| Var A | Var B | Type | Modifier | Year |
| --- | --- | --- | --- | --- |
| breastfeeding | breast cancer | Dependence | definitely | 2005 |
| breastfeeding | breast cancer | independence | may | 1970 |
| breastfeeding | breast cancer | dependence | | 2000 |

In this example, a majority rule yields two (2) votes for dependence and one (1) vote for independence—so the reconciled statement is a dependence statement.

In one example embodiment, the user assigns a weight of 0.2 to the first statement, 0.6 to the second one (e.g., possibly because of the experimental protocol, the famousness of the authors, or for any other objective and subjective reasons), and 0.2 to the last one, then the reconciled statement is of independence (weight/score of 0.6 for independence against 0.4 for dependence).

In one example embodiment, the user chooses to weight the statements based on publication year, giving less weights to the older ones, for instance assigning a weight of $0.9^{(2012-Year)}$ to each statement. This means that the first statement may be assigned a weight of about 0.48, the second a weight of about 0.01 and the third one a weight of 0.28, leading to a reconciled statement of dependence.

2. Aggregating reconciled statements into a BBN structure, i.e., into a directed acyclic graph. One process for aggregation is to first create the undirected graph associated with the reconciled statements, assuming lack of information is understood for instance as independence (but the reverse convention is as valid), and second to orient the edges by assigning a random order to the variables and orienting the edges from lower to higher rank, thus ensuring that no cycles are created in the process of orienting the arcs.

For instance, assuming in an example that there are together four variables (A, B, C and D) involved in the following list of reconciled statements:
A and B are dependent,
A and C are dependent,
B and D are dependent,
C and D are dependent,
A and D are independent.

Figure 6A:
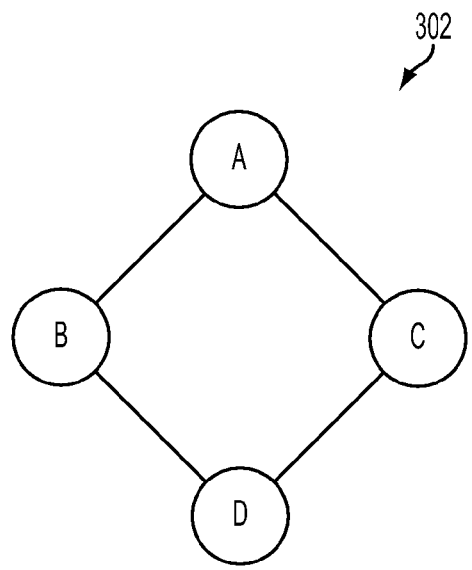
FIG. 6A shows an undirected graph 302 obtained from evidence statement (if lack of information is interpreted as independence)
Figure 6B:
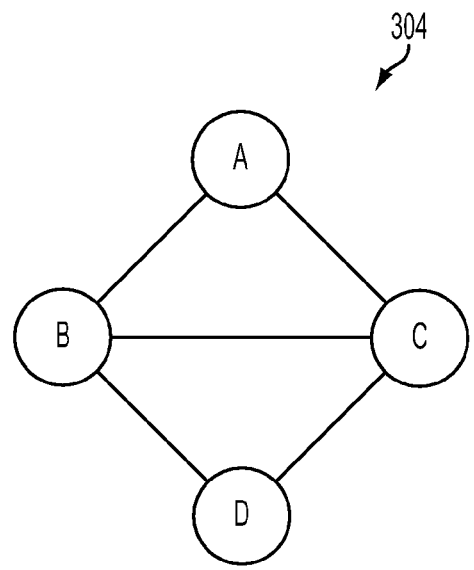
FIG. 6B shows an undirected graph 304 obtained from evidence statement (if lack of information means a dependence.

If there is no information about the relation between B and C; and if lack of information means independence, then there is obtained the undirected graph 302 as shown in FIG. 6A. If lack of information means dependence then there is obtained the undirected graph 304 as shown in FIG. 6B.

Figure 7A:
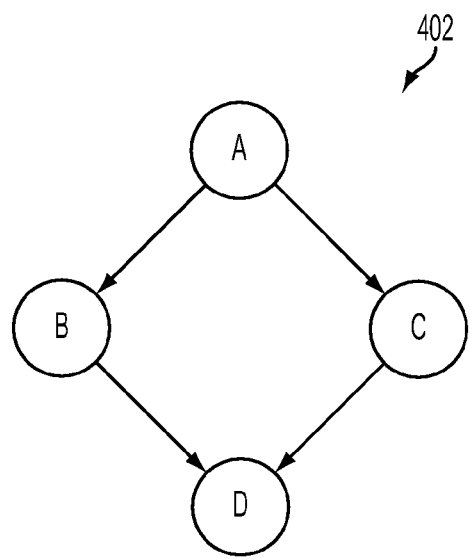
FIGS. 7A and 7B shows an undirected graph 402 and 404 (corresponding to graphs 302 and 304 of FIG. 6A, 6B, respectively) obtained from evidence statement when a random order of the variables A,B, C,D is assumed.
Figure 7B:
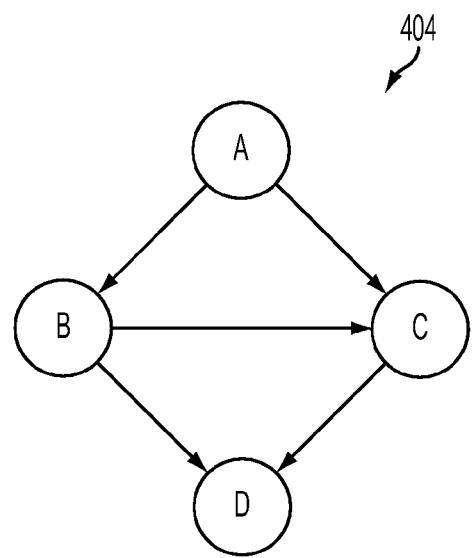

In one embodiment, a random order of the variables is an order, e.g., A,B,C,D, then the output BBN structures are the undirected graph 402 as shown in FIG. 7A, and the corresponding undirected graph 404 as shown in FIG. 7B.

Figure 8A:
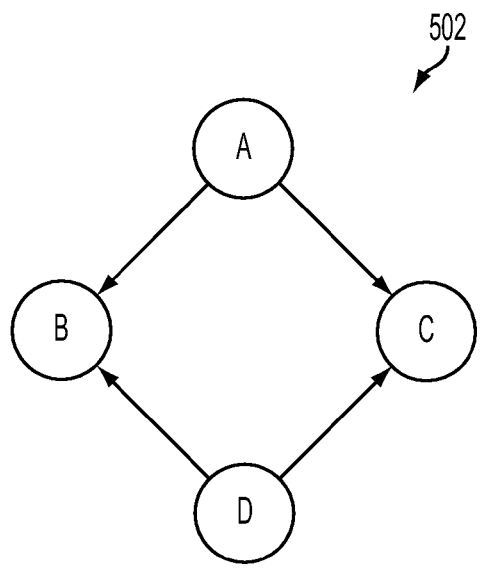
FIGS. 8A and 8B shows an undirected graph 502 and 504 (corresponding to graphs 302 and 304 of FIG. 6A, 6B, respectively) obtained from evidence statement when a random order of the variables D,A,C,B is assumed.
Figure 8B:
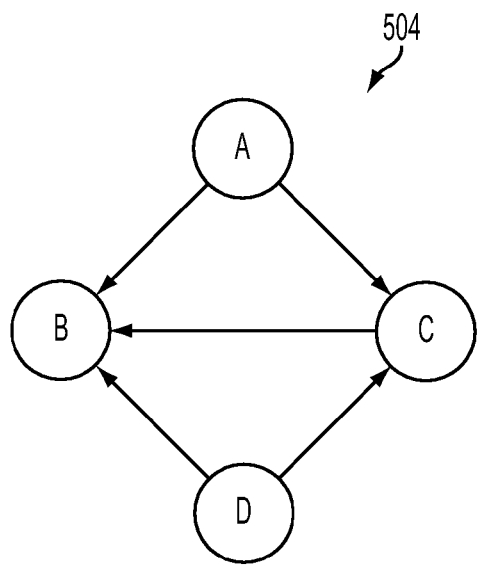

In one embodiment, a random order of the variables is D,A,C,B, then the output BBN structures are the undirected graph 502 as shown in FIG. 8A, and the corresponding undirected graph 504 as shown in FIG. 8B.

While the automated processes described herein are illustrative and no way limiting, further network structures may be defined in accordance with more sophisticated approaches. One such approach is based on the majority vote of the adjacency matrix of the graph, adapted for instance from Rush and Wallace (1997). In addition, a Bayesian approach as described by Richardson and Domingos (2003) is a further alternative where, instead of having as input BBN structures from multiples experts, there are provided evidence statements from multiples papers.

Finally yet another approach can be used based on an adaptation of the PC Algorithm (Spirtes, Glymour, Scheines, 1993). While the PC Algorithm is based on independence tests, it can be adapted by replacing those tests with the independence statements extracted from the evidence statement extraction after reconciliation for conflicting opinions. In this approach, conditional probabilistic dependence in taken into account (e.g., rather than simply unconditional dependence extraction). Further refinements of the PC algorithm, in particular those enforcing prior knowledge about the existence or absence of an arc (for cases that are obvious either for the user, or because there are a multitude of statements in agreement for dependence or independence), may be performed as relevant.

Returning now to FIG. 5, at 260, the system and method further performs extracting of probabilistic information into the BBN. From the sentence "Malaysian woman have a 1 in 20 chance of developing breast cancer in their lifetime." The process extracts P(breast cancer|Malaysian woman)=0.05. In one embodiment, extracting of probabilistic information into the BBN may be performed separately from the extraction of dependence information. However, as probabilistic information is frequently provided with or nearby dependence information, this information may be concurrently extracted. For probabilistic information extraction, a rule-based approach can be used and adapted to extract the probability information. Further implemented may be processes using machine learning techniques based on first identifying the numerical expressions, using for instance the method described in Habash and Roth (2008), then filtering the ones that are related to probability concepts and finally to mapping such expressions to the variables they represent. Generally, the method harvests a larger set of possible probabilities occurring in the text including basic probabilities as well as odds, odds ratio, relative risk, hazard ratio and population attributable risk, however, without the need to predefine any type for the variables.

Probability information extraction includes processing a text corpus to extract any information about probability or likelihood of variables. Beyond probability extraction (whether a number or a qualifier), the terms are mapped to a well formed probabilistic statement, P(A=a|B=b)=x, which typically is composed as a probability of a given set of variables (A) being in some specified state (a) given another set of variables (B) is in a specified state (b). Extracting probability statement can be divided into four steps:
 1. Searching probability values
 2. Extracting the variables
 3. Extracting clue terms
 4. Building a probability statement Extraction of numerical expressions (NUMs) is a challenging task because numbers can be represented in different forms: digits, multi-word sequences or a mix of both. One approach to detecting NUMs is based on a Support Vector Machine (SVM) classifier trained on NUMs extracted from the Penn Treebank (PTB) and the corpus of Numerical expressions. Note that numerical expressions are not annotated in the PTB. Therefore, NUMs present in the PTB are semi-automatically annotated based on their Part Of Speech (POS) tags and this annotated data is used to train a classifier with lexical and syntactic features as learning features. Normalising NUMs is done using an improved/extended version of the normalisation method such as described in Saleh, Tounsi and van Genabith 2011 entitled "ZamAn and Raqm: Extracting Temporal and Numerical Expressions in Arabic", and adapted for English.

Extracting the variables using Natural Language Processing tools is now described. In one embodiment, a rule-based method can be used that applies a set of syntactic heuristics which uses constituency and dependency trees and the probability value detected to extract the variables. However, syntactic parsers are generally trained on news data; e.g., the Penn Treebank's Wall Street Journal (WSJ) data. One method to address the problem of parsing out-of-domain data is to combine two treebanks, namely GENIA (Biomedical text) and PTB to improve the coverage of the syntactic parsers (e.g., see McClosky et al. 2006). The rule-based extraction combines the tree and the dependency structure of each sentence using head-rules to help recover the variables through heuristics.

One method that is performed by automated processes to extract the variables involves the following steps:
 splitting the abstracts into sentences (using OpenNLP tools),
 tokenising the sentences (using OpenNLP tools),
 resolving Anaphora (using OpenNLP tools),
 parsing using a constituency parser trained on the WSJ and the GENIA treebanks ((for instance using a constituency statistical parser),
 transforming the output of the parser from constituency to dependency relations using a conversion method such as the "Stanford conversion" (de Marneffe et al. 2006).
 percolating dependency information bottom up in the trees using syntactic head rules for English
 detecting the probability value in the trees using steps 1 and 2
 searching for the verb describing the probability value
 look up for the subject and object phrases associated with the verb describing the probability to identify the variables.
 clustering step to reduce the phrases to the main concepts [optional]

Another approach to both identify the probability values and extract the relevant variables includes using grammar transforms. In order to capture the probability values and variables associated with a probability statement, three new phrasal tags PROB_Value, PROB_VAR_A, PROB_VAR_B are introduced through the grammar and training data used by the syntactic parsers. The grammar is then updated using self-training on this new data. After parsing, the phrases are extracted to make them available to the optional clustering step. For example: the three phrases (NP, QP, PP) are transformed as follows: (NP (JJ Malaysian) (NNS woman))→(PROB_VAR_B (JJ Malaysian) (NNS woman)) (QP (CD 1) (IN in) (CD 20))→(PROB_Value (CD 1) (IN in) (CD 20)) (PP (S (VP( . . . )))→(PROB_VAR_A(S (VP( . . . ))) where NNS, NP, CD, QP, IN, VP, etc. are syntactic tags as defined by the Penn Treebank format. For example, NNS, CD, IN are Part-Of-Speech tags to indicate the type of the words: respectively, a plural noun, a cardinal number and a preposition; NP, QP, VP are phrasal tags to indicate the type of the syntactic phrase: respectively, nominal phrase, quantifier phrase and verbal phrase.

As in dependence relation extraction, an optional step to reduce the number of variables is to cluster them so that for instance "developing breast cancer" "likelihood of developing breast cancer in their life time" are mapped to the simpler variable "Breast Cancer". This may be performed automatically for instance using a breakdown of the syntactic structures of the variables into all possible sub-structures, or using external knowledge sources whenever available (such as UMLS), or based on machine learning clustering algorithms, or even based on user-input. The level of granularity of the variable is a modeling choice based on feedback from the user.

Extracting one or more clue terms and building a probability statement are further steps implemented. Clue terms are a set of key terms that indicate how to compute the probability, e.g., increase, decrease, reduce, etc. Those are processed by identifying the verbs indicating the probability values and filtering on a pre-define subset. Finally, a probability statement is built by combining each pieces of information extracted in the previous steps: type of probability, probability values, variables, and clue term.

Referring back to FIG. 5, at 265, a last step of the process for creating a Bayesian Network includes aggregating the probabilistic information within the BBN structure. This step focuses on populating a network structure with the probability information extracted. For instance, as shown in FIG. 9, given an undirected graph structure 602 from aggregation of dependence statements, the system and method performs extracting of probabilistic information into the BBN.

Figure 9:
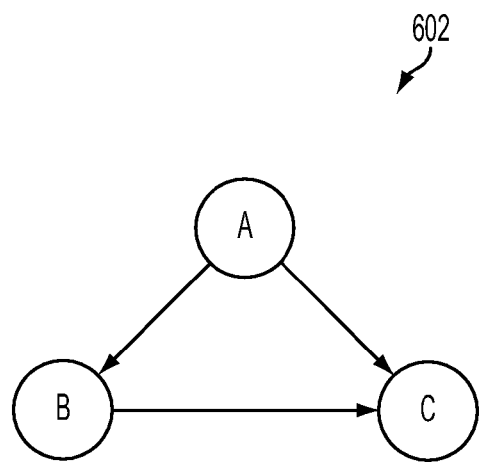
FIG. 9 shows a structure of an example structure resulting from aggregation of dependence statements.

The probabilistic information that is needed based on the graph structure 602 of FIG. 9, assuming for simplicity that each variable is binary, i.e. taking states A and Not A, for example, is:
P(A), P(B|A), P(B|NotA), P(C|A, B), P(C|NotA, B), P(C|A, NotB), P(C|NotA, NotB), It is noted that complements are valid as well since P(NotA)=1−P(A). In one embodiment, using the notation provided by Drudzel and Van der Gaag to capture qualitative and quantitative information in probability elicitation, there is performed a listing of the canonical elements of the joint distribution of ABC. In listing the canonical states, there is used a symbol # to denote "Not". The mutually exclusive, collective exhaustive canonical elements are shown in the following table:

| Abc   | a#bc   | #abc   | #a#bc   |
| ab#c  | a#b#c  | #ab#c  | #a#b#c  |

From those elements, any of the information that is sought can be expressed—implying that if values for the canonical elements can be estimated, then the information needed is recoverable. For the example graph structure of FIG. 9 the probabilistic information is expressed as:

$$P(A)=P(abc)+P(ab\#c)+P(a\#bc)+P(a\#b\#c)$$

$$P(B|A)=P(B,A)/P(A)=(P(abc)+P(ab\#c))/P(A)$$

$$P(B|Not\ A)=P(B,Not\ A)/P(Not\ A)=(P(\#abc)+P(\#ab\#c))/(1-P(A))$$

$$P(C|A,B)=P(abc)/(P(abc)+P(ab\#c))$$

Any information that has been extracted (and which may not be fully aligned with the information that is expressed) can also be expressed using the canonical elements.

That is, canonical elements are used as essential probabilities to which the probabilities required by the BBN structure and also probabilities expressed in text can be mapped to. So canonical elements serve as a common language between what is needed (i.e., BBN probabilities) and what is obtained (whatever is extracted from the text). Thus, given a simple network with two nodes, A and B and an arrow going from A to B then the probabilities that are needed are P(A) and P(B|A). In an implementation example, the ones that may be obtained from text could be P(B) and P(A|B) resulting in a mismatch. The canonical probability in this example would be P(A and B). Thus, by translating form probabilities that are extracted to canonical probabilities, there is obtained a system of linear equations that is needed to be solved. However, in many case, the system will have an infinity, or no feasible solutions, so in these cases the linear system of equations is solved by transforming it into an optimization problem, where the quantity that is trying to be optimized is, for instance, entropy (from information theory).

Thus, assuming, for example, that information is extracted from two (2) sources:
Source 1: P(A|B)=0.3, P(B)=0.8 P(A|Not B)=0.5
Source 2: P(C|A)=0.5, P(C|not A)=0.4
Then, it is the case that:

$$P(abc)+P(ab\#c)/(P(abc)+P(ab\#c)+P(\#abc)+P(\#ab\#c))=0.3$$

$$P(abc)+P(ab\#c)+P(\#abc)+P(\#ab\#c)=0.8$$

$$P(a\#bc)+P(a\#b\#c)/(1-P(abc)+P(ab\#c)+P(\#abc)+P(\#ab\#c))=0.5$$

$$P(abc)+P(a\#bc)/(P(abc)+P(a\#bc)+P(ab\#c)+(a\#b\#c))=0.5$$

$$P(\#abc)+P(\#a\#bc)/(P(\#abc)+P(\#a\#bc)+P(\#ab\#c)+P(\#a\#b\#c))=0.4$$

Thus, in this case, a linear system of equations is obtained which may be underdetermined indicating incomplete information in the first case, overdetermined indicating the presence of redundant and conflicting information in the second case (as when inconsistent). Approaches to address underdetermined system seek to identify, out of the infinite set of possible solutions, the best candidate, based on a criteria, a common such criteria being the maximization of the entropy (e.g., from information theory) of the joint distribution subject to the constraints from the information extracted. In the example of the graph structure of FIG. 9, the system is underdetermined. Using a maximum entropy approach yields the solution as shown in the following table:

| | | | |
|---|---|---|---|
| P(abc) = 0.12 | P(a#bc) = 0.05 | P(#abc) = 0.224 | P(#a#bc) = 0.04 |
| P(ab#c) = 0.12 | P(a#b#c) = 0.05 | P(#ab#c) = 0.336 | P(#a#b#c) = 0.06 |

Which thus yields:

$P(A)=0.34$ $P(B|A)=0.705882$ $P(B|NotA)=0.848485$ $P(C|A,B)=0.5$ $P(C|NotA,B)=0.4$ $P(C|A,NotB)=0.5$ $P(C|NotA,NotB)=0.4$

Now assuming that there is included further extracted probabilistic information from a further data source, as follows:
Source 3: P(A)=0.30

Then this results in having an inconsistent system due to the fact that, using the laws of probability, Source 1 implies that P(A)=0.34.

A possible approach to deal with conflicting information is to apply the method above for each source separately, derive the joint probabilities for each source, and aggregate the joint probability across the different sources. Such an approach is valid when sources are not internally conflicting. If they are internally conflicting, another approach is to minimize the conflict.

Returning to FIG. 3, the resulting BBN model may be edited by a domain expert via system interface component 95 (In FIG. 3), who can introduce new random variables and relationships, eliminate existing ones, and modify or introduce probability assertions.

Further, via system interface component 95, the BBN is displayable to the user, making use of ontology information (if present) to organize the graph by related concepts. The ontology provides additional information for possible display, and will support querying the BBN. For example, if a drug falling into a particular class has a given effect, it might be useful to know about other drugs in that class.

The system 50 further performs prompting the user for more information, such as prior probabilities, or asking the user to resolve conflicts. A domain expert (user) can apply the user interface 95 to extend the machine-generated Bayesian network, using it as a starting place for further development. Thus, in one embodiment, the process are ongoing to allow intelligent development of the network by the domain expert.

The authoring tool and methodologies described herein includes all automated tasks. However, via graphical user interface of FIG. 2, the user is enabled to scrutinize the results of the steps and gives feedback whenever relevant (correcting errors and choosing algorithms/parameters whenever relevant).

FIG. 10 illustrates one embodiment of an exemplary hardware configuration of a computing system 400 programmed to perform the method steps described herein with respect to FIGS. 1 and 3-5. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A Bayesian Belief Network (BBN) authoring system comprising:
one or more content sources providing content;
a programmed processing unit for communicating with said content sources and configured to:
access natural language text content stored in a content storage device, said natural language text content includes text units;
identify statements within said accessed natural language text content indicating a probabilistic dependence relation;
extract said statements indicating said probabilistic dependence relation from said natural language text content;
parse said extracted statement to generate a directed typed-dependency graph structure, said graph structure having nodes associated with words of said text unit, and said nodes being interconnected and associated with a label denoting a grammatical relation among said nodes; a parsed text unit including non-restrictive relative clauses and restrictive relative clauses;
break a directed typed-dependency graph into one or more subgraphs, a subgraph corresponding to restrictive relative clauses and a subgraph corresponding to non-restrictive relative clauses; each said subgraph processed separately to obtain evidence statements; and
aggregate said extracted statements and evidence statements to form a BBN network structure.

2. The system as claimed in claim 1, wherein said processor device is configured to:
obtain a set of typed dependencies among nodes from said directed typed-dependency graph structure.

3. The system as claimed in claim 2 wherein to identify statements indicating a probabilistic dependence relation, said programmed processing unit is configured to:
identify one or more lexical and semantic attributes of words within a text unit indicating a probabilistic dependence relation between two or more variables; and
add identified typed dependencies based on said identified word attributes to the set of typed dependencies obtained from said directed typed-dependency graph structure.

4. The system as claimed in claim 3, wherein to identify said one or more lexical and semantic attributes, said programmed processing unit is configured to: perform, for each word of said text unit, a table look-up of lexical information upon a database or corpus.

5. The system as claimed in claim 4, wherein said programmed processing unit is configured to:
correct for linguistic variations amongst statements representing said probabilistic dependence relations.

6. The system as claimed in claim 1, wherein to aggregate said extracted statements, said programmed processing unit is configured to:
determine statements having a same pair of variables;
reconcile statements having a same pair of variables; and
create a directed acyclic graph associated with the reconciled statements.

7. The system as claimed in claim 6, wherein to reconcile statements, said programmed processing unit is configured to:
count a number of statements setting forth a dependence relation category and an independence relation category; and
create an output statement of either dependence relation category or independence relation category.

8. The system as claimed in claim 5, further comprising:
applying transformational rules to map conditional dependence information to a canonical form.

9. The system as claimed in claim 1, wherein to form said BBN network structure, said programmed processing unit is further configured to:
identify from said text content quantitative probabilistic information associated with one or more variables; and build one or more quantitative probability statements from said extracted probabilistic information and said variables, a probability statement indicating a probability of a given variable being in a specified state given another variable in a specified state.

10. The system as claimed in claim 9, wherein to identify from said text content quantitative probabilistic information, said programmed processing unit is configured to perform one or more of:

identify and extract numerical expressions from said text content; or implement a rule-based approach for extracting quantitative probability statements directed to said one or more variables.

11. The system as claimed in claim 10, wherein said processor device is configured to:

reconcile said quantitative probability statements with the BBN network structure.

12. The system as claimed in claim 1, comprising:

a user interface to a computing system implementing said programmed processing unit for authoring said BBN, wherein via said user interface, said authoring includes a user assisting in one or more said identifying, extracting and statement aggregating to form the BBN network structure.

13. A computer program product for authoring a Bayesian Belief Network (BBN), the computer program product comprising a non-transitory tangible storage medium, said medium readable by a processing circuit and storing instructions run by the processing circuit for performing a method, the method comprising:

accessing natural language text content stored in a content storage device, said natural language text content includes text units;

identifying statements within said accessed natural language text content indicating a probabilistic dependence relation;

extracting said statements indicating said probabilistic dependence relation from said natural language text content;

parsing said extracted statement to generate a directed typed-dependency graph structure, said graph structure having nodes associated with words of said text unit, and said nodes being interconnected and associated with a label denoting a grammatical relation among said nodes; a parsed text unit including non-restrictive relative clauses and restrictive relative clauses;

breaking a directed typed-dependency graph into one or more subgraphs, a subgraph corresponding to restrictive relative clauses and a subgraph corresponding to non-restrictive relative clauses; each said subgraph processed separately to obtain evidence statements; and aggregating said extracted statements and evidence statements to form a BBN network structure, wherein a programmed processing unit performs said identifying, statement extracting, and aggregating.

14. The computer program product of claim 13, wherein said method further comprises:

obtaining a set of typed dependencies among nodes from said directed typed-dependency graph structure.

15. The computer program product of claim 14 wherein said identifying statements indicating a probabilistic dependence relation comprises:

identifying one or more lexical and semantic attributes of words within a text unit indicating a probabilistic dependence relation between two or more variables; and adding identified typed dependencies based on said identified word attributes to the set of typed dependencies obtained from said directed typed-dependency graph structure.

16. The computer program product as claimed in claim 15, wherein said identifying said one or more lexical and semantic attributes comprises: performing, for each word of said text unit, a table look-up of lexical information upon a database or corpus.

17. The computer program product as claimed in claim 13, wherein said forming said BBN network structure further comprises:

identifying from said text content quantitative probabilistic information associated with one or more variables; and building one or more quantitative probability statements from said extracted probabilistic information and said variables, said probability statement indicating a probability of a given variable being in a specified state given another variable in a specified state.

* * * * *